P. W. McGUIRE.

TIRE AND FELLY FOR WHEELS.

No. 10,676. Reissued Dec. 29, 1885.

*Inventor.*

*Patrick W. Mc. Guire,*

*By* W. C. McIntire

*Attorney.*

*Witnesses:*

T. C. Brecht

David H. Mead.

N. PETERS, Photo-Lithographer, Washington, D. C.

UNITED STATES PATENT OFFICE.

PATRICK W. McGUIRE, OF SOUTH BEND, INDIANA.

TIRE AND FELLY FOR WHEELS.

SPECIFICATION forming part of Reissued Letters Patent No. 10,676, dated December 29, 1885.

Original No. 292,028, dated January 15, 1884. Application for reissue filed September 15, 1884. Serial No. 143,144.

*To all whom it may concern:*

Be it known that I, PATRICK W. McGUIRE, of South Bend, in the county of St. Joseph and State of Indiana, have invented certain new and useful Improvements in Tires and Fellies for Wheels, of which the following is a full, clear, and exact description.

My invention relates to certain new and useful improvements in tires and fellies for wheels.

It has for its objects to secure the tire in place without the intervention of any bolts or screws, and to render the union strong and durable; and with these ends in view my invention consists in forming the fellies with a central convex rib and the tire with a corresponding groove adapted to receive the felly-rib when the tire is shrunk onto the felly, as will be hereinafter fully explained.

In order that those skilled in the art to which my invention appertains may know how to make and use the same, I will describe the construction and advantages of my improvements, referring by letters to the accompanying drawings, in which—

Figure 1:
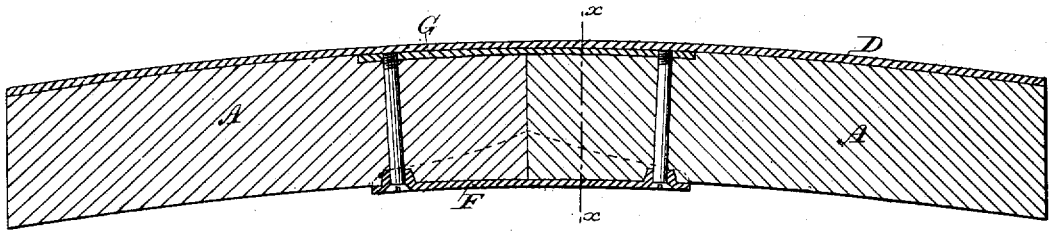
Figure 2:
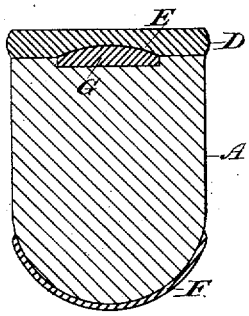
Figure 3:
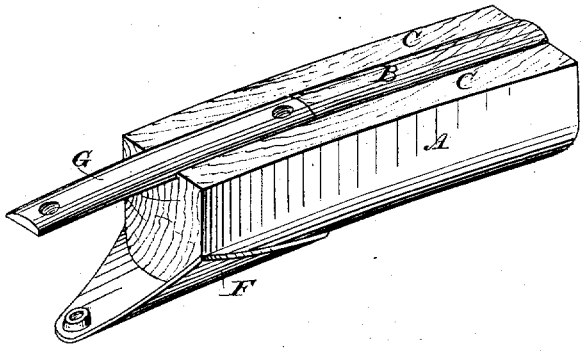

Figure 1 is a central longitudinal section of two adjacent fellies of a wheel with the tire in place and embodying my invention. Fig. 2 is a transverse section taken at *x x* of Fig. 1. Fig. 3 is a perspective view of a felly-plate and metallic securing-rib.

Similar letters indicate like parts in the several figures.

A represents the fellies, the outer circumference or surface of which is formed with a central curved rib, B, which occupies about one-third of the tread, the surface of each side being flat, as seen at C C.

D is the metal tire, which is formed with a groove, E, corresponding to and adapted to interlock with the tongue or rib B of the felly when the tire is shrunk into place. The rib B projects above the flat treads C a distance equal to the shrinkage of the tire, which, in its hot or expanded condition, is passed over the rib and then immersed in water to shrink the same. The ends of adjacent fellies are tied together by felly-plates F on the inside of the fellies and a short connection metallic rib, G, which forms a continuation of the permanent rib B, the metallic rib G being slightly recessed into the body of the felly and having its ends abutting snugly against the ribs B, so as to make a tight joint. Bolts or screws connect the felly-plate F and metallic rib G, and thus secure the adjacent fellies in a fixed and proper relation to each other, preventing not only longitudinal but also lateral displacement. When the tire is shrunk onto the fellies or rim, it will be seen that the rib and groove serve to prevent any lateral or sidewise movement of the tire, and that all securing-bolts are thus dispensed with, which is a great desideratum, as they tend, necessarily, to weaken the felly and tire.

It will be understood that my invention is based upon the practical fact that it is essential to have a flat bearing of at least two-thirds of the width of the felly, in order to prevent the shattering or splintering of outer sides of the felly and the paint and varnish thereon; and it will be observed that all strain exerted upon a wheel involving my invention is applied directly over the point where the spokes are tenoned into the fellies, and that by reason of flat bearing-surfaces C C each side of the rib B no rocking motion of the tire can take place, and hence no opportunity is afforded for the entrance of sand or gravel between the tire and felly; and it will also be understood that by reason of the outside edges of the tire, or those portions corresponding with the treads C C of the felly, being flat, the tire is much more readily slipped over the rib B than could be done were the tire formed in any other than the ordinary way.

I am aware that it is not new, broadly, to construct tires and fellies with interlocking surfaces, and that it is also not new to form tires with projecting flanges of various designs, adapted to receive projections on the periphery of the fellies, and do not wish to be understood as making any such broad claim, the distinction between all such devices and my invention resting in the fact that in the former cases the flanges or holding-surfaces of the tires project below the contact-face of the tire, while in my invention the tire is formed with a central groove below the contact-face, enabling me to practically and successfully use a traveler in measuring the rim, and also enabling me to successfully and expeditiously weld the tire.

What I do claim as new, and desire to secure by Letters Patent, is—

1. The combination, with the fellies having a central raised rib, B, of the tire D, having a central channel or groove, E, formed below the contact-face of the tire and corresponding in form to the rib B, substantially as and for the purpose set forth.

2. The combination, with the felly A, having the curved central rib, B, the metallic rib G, adapted to form a continuation of the rib B, and the tire D, provided with the central groove corresponding to the rib B of the felly, substantially as and for the purpose set forth.

In testimony whereof I have hereunto set my hand in the presence of two subscribing witnesses.

PATRICK W. McGUIRE.

Witnesses:

JAMES DU SHANE,

JOHN A. HIBBERD.